United States Patent
Silverbrook et al.

(10) Patent No.: US 7,533,022 B2
(45) Date of Patent: *May 12, 2009

(54) PRINTED MEDIA WITH MACHINE READABLE MARKINGS

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 631 days.

This patent is subject to a terminal disclaimer.

(21) Appl. No.: 10/982,834

(22) Filed: Nov. 8, 2004

(65) Prior Publication Data

US 2005/0062281 A1   Mar. 24, 2005

Related U.S. Application Data

(63) Continuation of application No. 10/636,220, filed on Aug. 8, 2003, now Pat. No. 7,155,394, which is a continuation of application No. 09/690,078, filed on Oct. 20, 2000, now Pat. No. 6,647,369.

(51) Int. Cl.
*G10L 19/00* (2006.01)
(52) U.S. Cl. .................. 704/270; 704/500
(58) Field of Classification Search .......... 704/270, 704/500
See application file for complete search history.

(56) References Cited

U.S. PATENT DOCUMENTS

| | | | |
|---|---|---|---|
| 4,632,585 A | 12/1986 | Oyamatsu et al. | |
| 4,681,430 A | 7/1987 | Goel et al. | |
| 4,937,676 A | 6/1990 | Finelli et al. | |
| 4,983,996 A | 1/1991 | Kinoshita | |
| 5,719,621 A | 2/1998 | Tsunefuji | |
| 5,726,693 A | 3/1998 | Sharma et al. | |
| 5,841,513 A | 11/1998 | Yoshimura et al. | |
| 5,878,292 A | 3/1999 | Bell et al. | |
| 5,915,027 A | 6/1999 | Cox et al. | |
| RE36,589 E | 2/2000 | Akamine et al. | |
| 6,037,915 A | 3/2000 | Matsueda et al. | |
| 6,078,758 A | 6/2000 | Patton et al. | |
| 6,094,279 A | 7/2000 | Soscia | |
| 6,252,971 B1 | 6/2001 | Wang | |
| 6,441,921 B1 | 8/2002 | Soscia | |
| 6,647,369 B1 | 11/2003 | Silverbrook et al. | |
| 6,687,383 B1 | 2/2004 | Kanevsky et al. | |
| 7,155,394 B2 * | 12/2006 | Silverbrook et al. | ........ 704/278 |

FOREIGN PATENT DOCUMENTS

| | | |
|---|---|---|
| EP | 907139 | 4/1999 |
| EP | 974924 | 1/2000 |
| JP | 07-108786 | 4/1995 |
| JP | 11-167173 | 6/1999 |
| JP | 2000-222520 | 8/2000 |
| WO | WO 99/04368 A | 1/1999 |
| WO | WO 0 235 286 | 5/2002 |

* cited by examiner

*Primary Examiner*—Abul Azad

(57) ABSTRACT

A printed media, such as a card bears a visible light image, such as a picture or photograph, for viewing by a human. A machine readable array of infra-red dots is located over the visible light image. In a preferred embodiment the infra-red dots encode sound recording data associated with the visible light image. Solomon-Reed encoding and checkerboard modulation of the dots is employed to ensure reliable retrieval of the sound recording.

10 Claims, 4 Drawing Sheets

PRINTED MEDIA WITH MACHINE READABLE MARKINGS

CROSS REFERENCES TO RELATED APPLICATIONS

The present application is a Continuation of U.S. application Ser. No. 10/636,220 filed on Aug. 8, 2003, now issued U.S. Pat. No. 7,155,394, which is a Continuation of U.S. application Ser. No. 09/690,078 filed on Oct. 20, 2000, now issued U.S. Pat. No. 6,647,369.

FIELD OF THE INVENTION

The present invention relates to a camera system having an integral sound recording means for recording and outputting a permanent record of sound associated with a photograph and recorded in infra-red ink over the photograph. Hence, the present invention relates to a photograph reader to decode sound and play sound.

The present invention also relates to a means for reproducing the recorded sound and discloses a photograph reader to decode sound and play sound.

CO-PENDING APPLICATIONS

Various methods, systems and apparatus relating to the present invention are disclosed in the following co-pending applications filed by the applicant or assignee of the present invention simultaneously with the present application:

| U.S. patent/Application Ser. No. | | | | |
|---|---|---|---|---|
| 6496654 | 6859225 | 6924835 | 6943830 | 09/693,317 |

The disclosures of these co-pending applications are incorporated herein by reference.

Various methods, systems and apparatus relating to the present invention are disclosed in the following co-pending application filed by the applicant or assignee of the present invention on Jul. 10, 1998:

| 6750901 | 6476863 | 6459495 |
|---|---|---|

The disclosures of this co-pending application are incorporated herein by reference.

Various methods, systems and apparatus relating to the present invention are disclosed in the following co-pending applications filed by the applicant or assignee of the present invention on Jun. 30, 2000:

| 6471331 | 6676250 | 6347864 | 6439704 | 6425700 | 6588952 |
|---|---|---|---|---|---|

The disclosures of these co-pending applications is incorporated herein by reference.

BACKGROUND OF THE INVENTION

The production of images by means of photographic techniques have been well known for a substantial period of time. Further, recently, digital cameras have become increasingly popular where an image is captured by the digital camera device and stored for later printing.

In applicant's U.S. Pat. Nos. 6,750,901, 6,476,863 and application Ser. No. 09/113,222, a camera system has been proposed that includes an integral printer device for the printing out of sensed images.

When using such devices and other image capture devices it will be desirable to be able to suitably deal with audio and other environmental information when taking a picture.

In applicant's application Ser. No. 09/113,107 one such device was disclosed in which audio data was recorded on the rear of a card or photograph using black ink on a white background. A reader could read the data and reproduce the signal through audio generator means when the card or photograph was passed through a scanner means.

In U.S. Pat. No. 5,896,403 (Nagasaki et al.) a printing system is disclosed which prints images and audio information on print media, for example, a sheet, in dot codes which can be read by a pen device. The information can be decoded notwithstanding scanning of the data being irregular or random due to the organization of the dot codes. In Nagasaki et al. system the scanning of data is low. In applicant's printing and scanning system as disclosed in Ser. No. 09/113,107 the process is a pagewidth process rather than a line by line process as in Nagasaki et al.

SUMMARY OF THE INVENTION

The present invention relates to a camera system able to record audio when acquiring a sensed image in addition to being able to playback the audio information when viewing a "photograph", the audio and "photograph" being recorded on the same surface of a print media.

In accordance with a first aspect of the present invention, there is provided a system for playing prerecorded audio encoded in a fault tolerant manner as an array of invisible ink dots printed on a photograph in substantially the same area thereas comprising: an infrared scanner means for scanning the printed invisible ink dots of said prerecorded audio; a processor means interconnected to said infra-red scanner means for decoding said scanned audio encoding to produce a corresponding audio signal; and audio emitter means interconnected to said processor means for emitting or playing said corresponding audio signal on demand.

The invisible ink may be an infrared (IR) absorbing ink with negligible absorption in the visible spectrum.

The encoding can include Reed-Solomon encoding of the prerecorded audio and comprises an array of IR (infrared) ink dots which are printed on the photograph using a page width ink jet printhead. The array of dots may be high frequency modulated to aid scanning, for example using a checkerboard pattern.

The system can include a wand-like arm having a slot through which is inserted the photograph.

In another aspect, the invention provides a n audio playback device for playing prerecorded audio represented by an array of dots and carried by a substrate carrying an image in substantially the same area thereas, a substrate carrying an image and including an array being substantially identical, to an average unaided human eye, to the same substrate and image not including an array, the audio playback device comprising:

a detector that detects the array of dots and outputs a first signal representative thereof;

a decoder interconnected to said detector that receives and decodes said first signal to produce a second signal corresponding to the first signal; and audio emitter interconnected to said decoder that receives said second signal generates sounds corresponding to the second signal.

The detector may detect the array of dots optically.

The dots may be dots of ink and the ink may be an infra-red (IR) absorbing ink with little absorption in the visible spectrum.

In accordance with a further aspect of the present invention, there is provided a method of playing a prerecorded audio signal encoded as an array of dots and carried by a substrate carrying an image in substantially the same area thereas, a substrate carrying an image and including an array being substantially identical, to an average unaided human eye, to the same substrate and image not including an array, said method comprising the steps of:

(a) detecting the array on the substrate and outputting a first signal corresponding thereto;
(b) decoding said first signal and outputting a second signal
(c) receiving the second signal in an audio emitter and generating sounds corresponding to the second signal.

The array of dots may be detected optically and may be detected using at least the infrared spectrum. The dots may be provided using an infrared absorbing ink with little absorption in the visible spectrum.

In accordance with a further aspect of the present invention, there is provided a method of decoding a prerecorded audio signal printed as an array of invisible ink dots in a fault tolerant encoded form on a surface of a photograph coincident with an image printed on said surface of said photograph, said method comprising the steps of:

(a) scanning the printed encoded form of said prerecorded audio on said photograph in the infra-red;
(b) decoding said encoded audio signal; and
(c) playing said audio signal on an audio output device.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

The preferred embodiment is preferably implemented through suitable programming of a hand held camera device such as that described in U.S. Pat. Nos. 6,750,901 and 6,476,863.

The aforementioned patent specifications disclose a camera system, hereinafter known as an "Artcam" type camera, wherein sensed images can be directly printed out by an Artcam portable camera unit. Further, the aforementioned specifications disclose means and method for performing various manipulations on images captured by the camera sensing device leading to the production of various effects in any output image. The manipulations are disclosed to be highly flexible in nature and can be implemented through the insertion into the Artcam of cards having encoded thereon various instructions for the manipulation of images, the cards being known as Artcards. The Artcam further has significant onboard processing power implemented by an Artcam Central Processor unit (ACP) which is interconnected to a memory device for the storage of import data and images.

In the preferred embodiment, the Artcam device is suitably modified so as to equip it with a microphone device and associated recording technologies. When a picture is taken, the opportunity is provided to record either the surrounding sound environment or a message associated with the image. The recorded audio is then printed on the photograph in an encoded format, the encoding preferably being of a highly resilient form. The recorded audio provides a permanent audio record associated with the photograph. Subsequently, a playback apparatus is provided for scanning the encoded audio and decoding this information.

Figure 1:
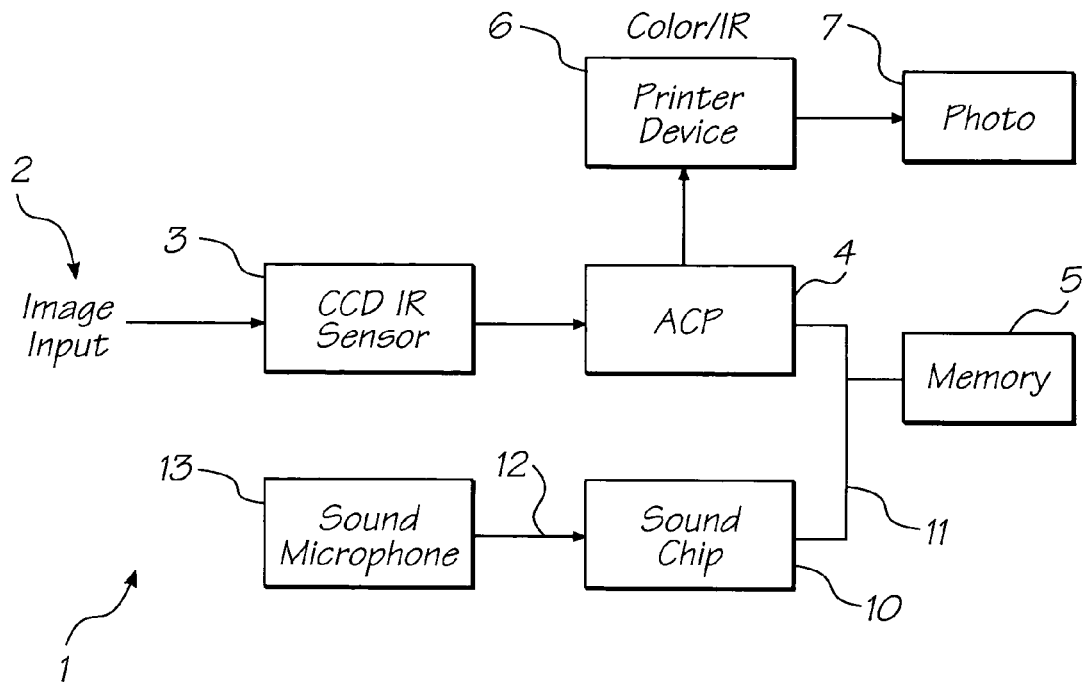
FIG. 1 illustrates schematically the camera system constructed in accordance to the preferred embodiment.

Turning now to FIG. 1, there is illustrated, in schematic form the preferred embodiment 1 which includes the arrangement as described in the aforementioned patent specifications wherein an image 2 is sensed via a CCD sensor 3 and forwarded to an Artcam central processor 4 which includes significant computational resources as described in the aforementioned patent specifications. The Artcam central processor 4 can store the image in memory 5 which preferably comprises a high speed RAMBUS (Trade Mark) interfaced memory. The Artcam central processor 4 is also responsible for controlling the operation of a printer device 6 having a page width ink jet printhead 15 (see FIG. 2) for the printing out of full color photographs, eg. 7, so as to provide for instant images on demand. The printhead 15 can print color images and has at least (4) ink jet nozzles for printing at a resolution of 1600 dpi. The four inks include an infra-red ink for printing data, and cyan, magenta and yellow inks for printing a color image. Such a printhead, but having the capacity to print with six (6) inks, is disclosed in applicant's U.S. Pat. Nos. 6,471,331, 6,676,250, 6,347,864, 6,439,704, 6,425,700, and 6,588,952 using a monolithic construction.

In the preferred embodiment, the camera arrangement 1 is also supplied with a sound chip 10 which interfaces via RAMBUS bus 11 to memory 5 under the control of the ACP processor 4. The sound chip 10 can be of a standard or specialized form and can, for example, comprise a DSP processor that takes an analogue input 12 from a sound microphone 13. Alternatively, with increasing chip complexities (Moore's Law), the functionality of sound chip 10 can be incorporated onto the ACP chip which preferably comprises a leading edge CMOS type integrated in circuit chip. It will be readily evident that many other types of arrangements can be provided which fall within the scope of the present invention. The sound chip 10 converts the analogue input 12 to a corresponding digital form and forwards it for storage in memory 5. The recording process can be activated by means of the depressing of a button (not shown) on the camera device, the button being under the control of the ACP processor 4 otherwise it can be substantially automatic when taking a photograph. The recorded data is stored in the memory 5.

Figure 2:
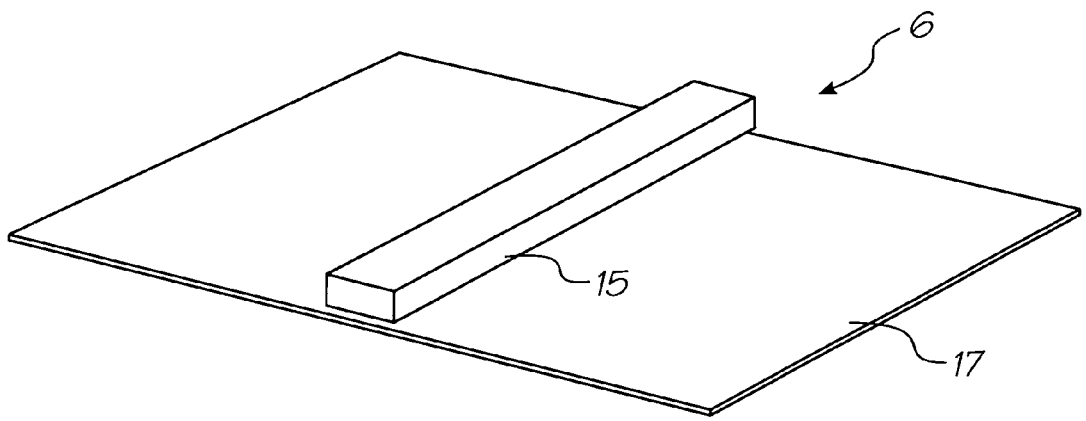
FIG. 2 illustrates schematically a printer mechanism for printing on the output media.

Turning now to FIG. 2, the camera arrangement preferably includes a printer device 6 which includes printhead 15. The printhead 15 is utilized to print an image on print media 17 and at the same time print audio (or other) information on the same face of print output media 17 using an IR ink. Similar arrangements but for printing information on the back of an output photo image are described in Ser. No. 09/112,741, the contents of which are hereby incorporated by reference mutatis mutandis. By using a single printhead a simpler apparatus is provided than as therein disclosed. The applicant has disclosed an infrared ink suitable for this purpose in Australian Provisional Patents Applications PQ9412 and PQ9376 both filed on Aug. 14, 2000 and applicant's applications PQ9509 filed on Aug. 18, 2000, and PQ9571, and PQ9561 both filed on Aug. 21, 2000.

Figure 3:
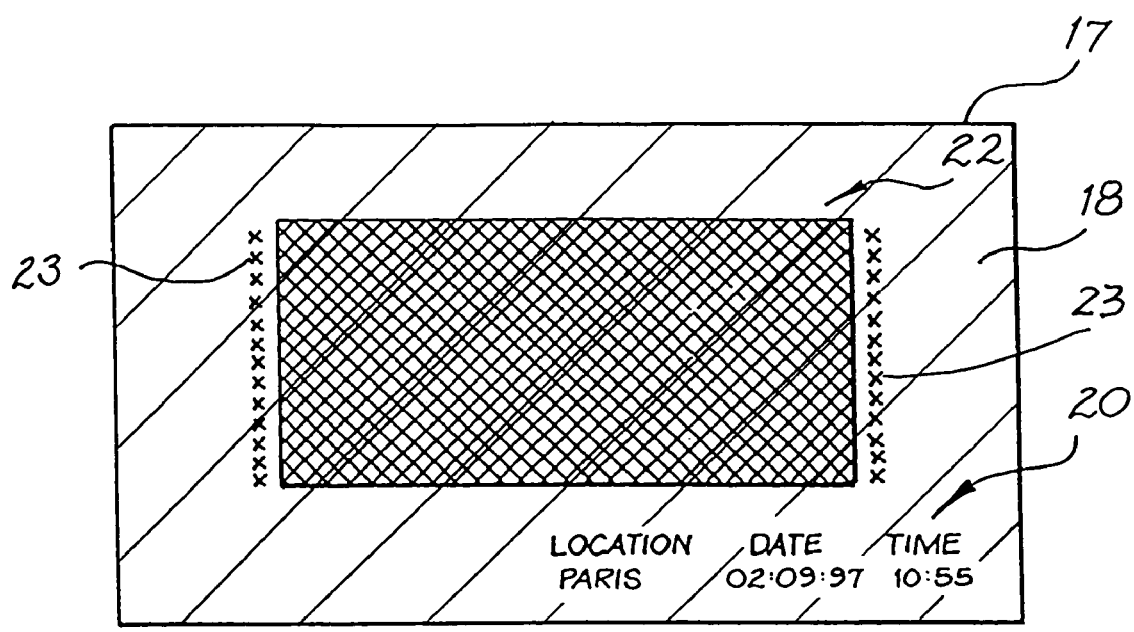
FIG. 3 illustrates a format of the output data on the photograph.
Figure 4:
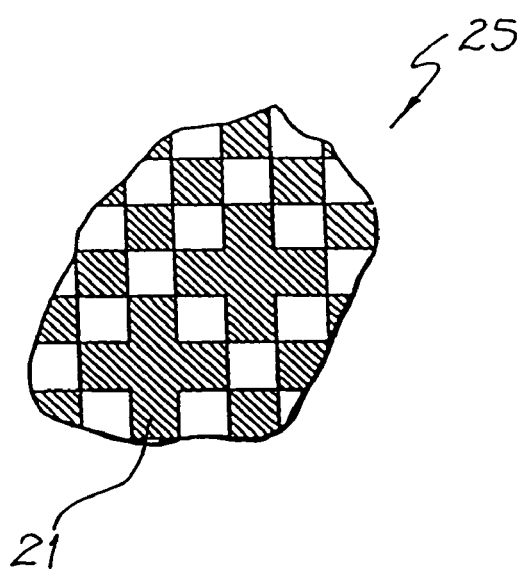
FIG. 4 illustrates an enlarged portion of the output media.

Turning now to FIG. 3, there is illustrated an example of output printed on the photographic media 17. The media 17 includes a photographic image 18 along with which is printed information 20 and data 22. The detail of the image 18 is not shown for ease of illustration. The information 20 can include location, date and time data with the location data being provided by means of keyboard input or, alternatively, through the utilization of attached positioning systems such as GPS or the like. The information 20 is presented in a viewable form. The data 22 is provided in an encoded invisible (but infra-red visible) form with the beginning and end thereof marked by target boundaries 23. The format of the encoding can be many and various, however, preferably the encoding is provided in a highly fault tolerant manner so as to tolerate scratches, grime, writing, wear, rotation, fading etc. One form of suitable technology is the printing technology utilized in the construction of "Artcards" as described in the aforementioned patent specifications U.S. Pat. No. 6,750,901 or as disclosed in Ser. No. 09/113,070 and U.S. Pat. No. 6,459,495 or the co-pending U.S. Pat. No. 6,496,654, Ser. Nos. 09/693,083 and 09/693,134 filed concurrently herewith. The encoding format relies heavily upon utilization of Reed-Solomon encoding of the data to provide for a high degree of fault tolerance. A portion of the data 25 is shown in schematic form in FIG. 4 and the data comprises an array of IR dots as printed by the printhead 15 of FIG. 2 which is additionally modulated by a high frequency "checkerboard" pattern 21 added to the data so as to assist in sensing of the encoded data. The data 22, in this particular instance, can comprise sound data as well as image information 20. The disclosed methodologies as discussed in applicant's co-pending U.S. Pat. No. 6,496,654, Ser. Nos. 09/693,083 and 09/693,134 provide for the storage of about 6 Megabytes of arbitrary data on a photograph having a size of 4"×6"(102 mm.×152 mm.) for data printed at a resolution of 1600 dpi.

When it is desired to "play back" the recorded audio, the photograph 17 is passed through a reader device 26 which includes pinch rollers for pinch rolling the photograph 17 past a linear CCD sensor device 27 sensitive to infra-red, the photograph 17 being illuminated by an infra-red source of complimentary characteristics. The sensor device 27 can be a suitably adapted sensor device as described in the aforementioned patent specification or in applicant's application Ser. No. 09/693,317 specification. Suitable sensors are found in flat bed scanners or facsimile machines. The sensors of the CCD device are provided with lensing and/or filtering arrangements to optimize their sensitivity and coverage to that of the photograph's size and the spectral characteristics of the IR ink. An ink with minimal response in the wavelength range 400-700 mm and maximal response in the wavelength range 700 mm-1200 mm has been found suitable as disclosed in Australian Provisional Patent Applications PQ9412 and PQ9376 filed on 14 Aug. 2000 and applicant's applications PQ9509 filed on 18 Aug. 2000, and PQ9571, and PQ9561 filed on 21 Aug. 2000.

Figure 5:
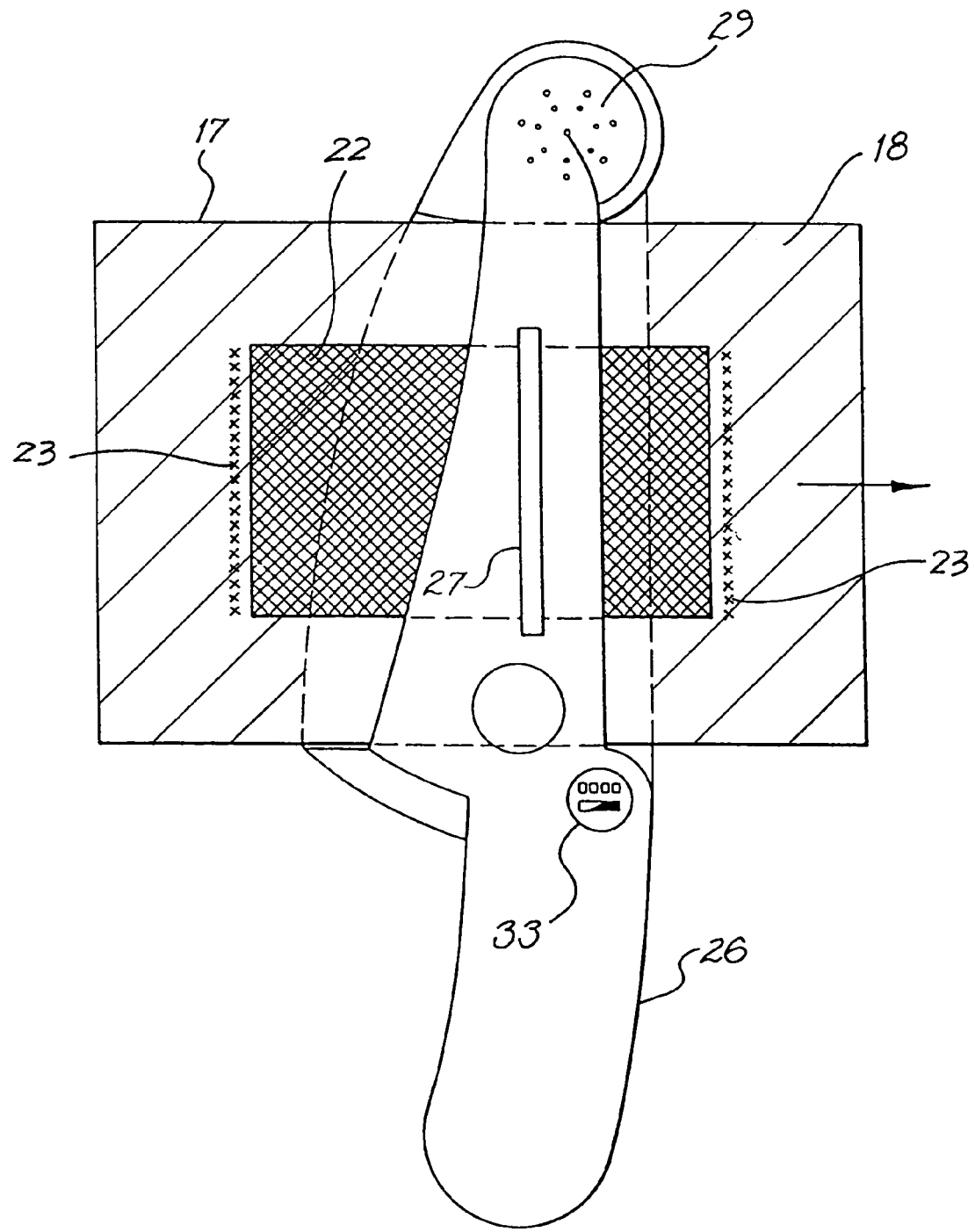
FIG. 5 illustrates a reader device utilized to read data from the photograph.
Figure 6:
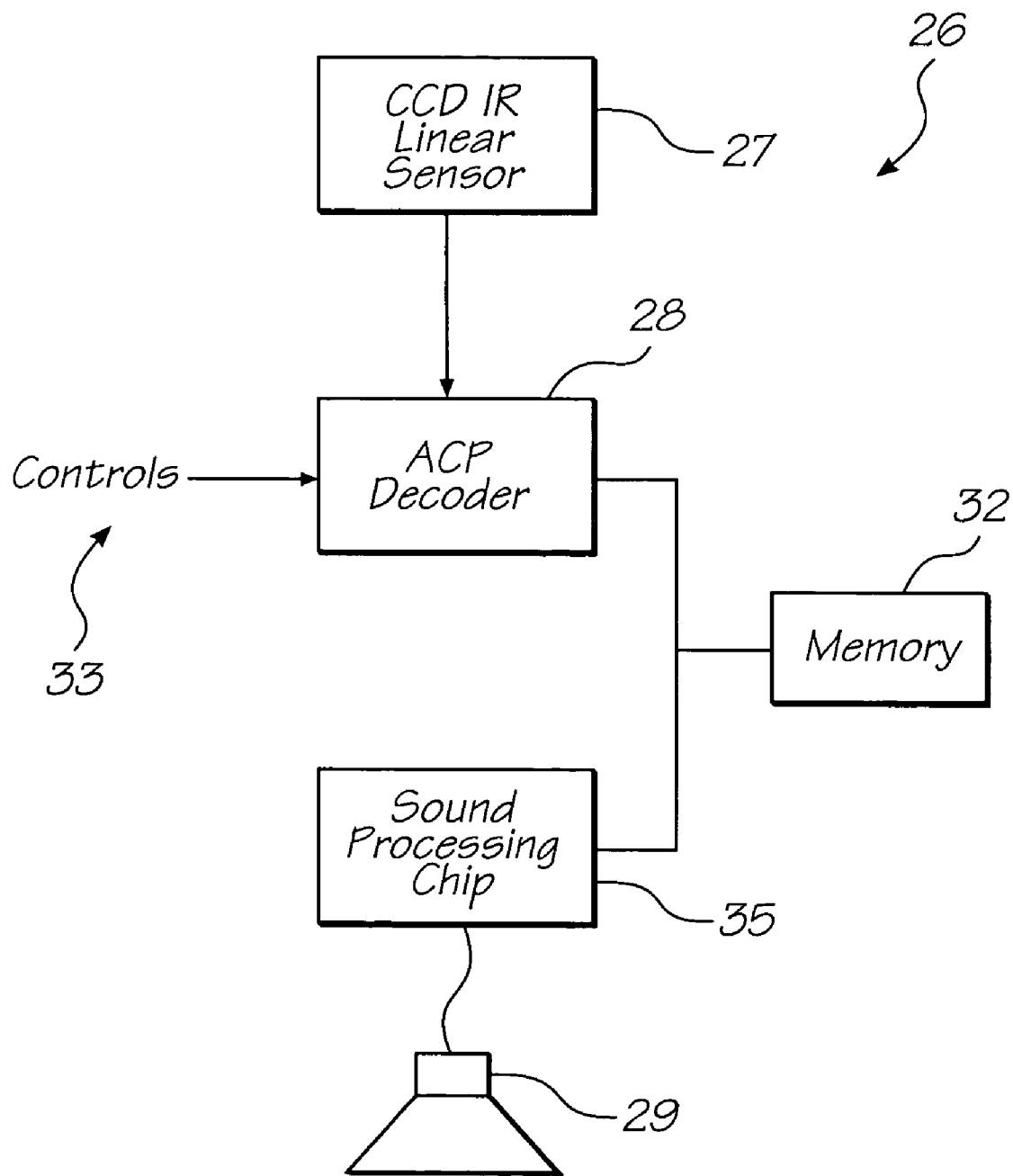
FIG. 6 illustrates the utilization of an apparatus of the preferred embodiment.

Referring now to FIG. 6, there is illustrated in schematic form the operation of the audio reader device 26 of FIG. 5. The linear CCD IR sensor 27 is interconnected to a second Artcam central processor 28 which is suitably adapted to read and decode the data stored in infra-red on the photograph. The decoded audio information is stored in memory 32 for playback via a sound processing chip 33 on speaker 29. The sound processing chip 33 can operate under the control of the ACP decoder 28 which in turn operates under the control of various user input controls 33 which can include volume controls, rewind, play and fast forward controls etc. Importantly, the CCD linear IR sensor 27 and the ACP decoder 28 can implement the reading process as if the information were printed in an Artcard or an alternative Artcard format as described in the aforementioned patent specifications U.S. Pat. Nos. 6,476,863 and 6,459,495, or applicant's co-pending U.S. patent application Ser. No. 6,496,654, Ser. Nos. 09/693,083 and 09/693,134.

It can be seen from the foregoing description of the preferred embodiment that there is provided a system for the automatic recording of audio associated with an output image so as to provide an audio record associated with a photograph. There is also disclosed an audio reader system for reading an audio output recorded on a photograph with IR ink.

It would be appreciated by a person skilled in the art that numerous variations and/or modifications any be made to the present invention as shown in the specific embodiment without departing from the spirit or scope of the invention as broadly described. For example, the utilization of more complex audio recording and playback techniques such as stereo and B-format techniques. The present embodiment is, therefore, to be considered in all respects to be illustrative and not restrictive.

The invention claimed is:

1. A printed media comprising:
   a photographic medium;
   a visible light ink printed on said medium, the visible light ink representing an image for viewing by a human; and
   infra-red ink printed over said visible light ink, said infra-red defining a machine readable array of markings invisible to the human eye, the markings encoding data.

2. A printed media according to claim 1, wherein the machine readable array of invisible markings encode sound recording data.

3. A printed media according to claim 1, wherein the machine readable array of invisible markings are arranged for playback by a device including a linear print media transport assembly.

4. A printed media according to claim 3, wherein the infra-red markings included dots modulated with a regular pattern to assist the playback device during playback of the printed media.

5. A printed media according to claim 1, further including boundary markings indicating limits of the machine readable array of invisible markings.

6. A printed media according to claim 4, wherein the regular pattern comprises a checkerboard pattern.

7. A printed media according to claim 1, wherein the infra-red ink markings are formed of an ink with minimal response in a wavelength range of 400-700 mm.

8. A printed media according to claim 1, wherein the infra-red ink markings are formed of an ink with maximal response in the wavelength range 700-1200 mm.

9. A printed media according to claim 1, wherein the machine readable array of invisible markings encodes data according to Reed-Solomon coding.

10. A printed media according to claim 1, wherein the data comprises a sound recording that relates to the visible light image.

* * * * *

UNITED STATES PATENT AND TRADEMARK OFFICE
CERTIFICATE OF CORRECTION

PATENT NO. : 7,533,022 B2 Page 1 of 1
APPLICATION NO. : 10/982834
DATED : May 12, 2009
INVENTOR(S) : Kia Silverbrook et al.

It is certified that error appears in the above-identified patent and that said Letters Patent is hereby corrected as shown below:

Title Page, Item (63) should be inserted after (22) to read
--(63) Continuation of application No. 10/636,220, filed on August 8, 2003, now Pat. No. 7,155,394, which is a continuation of application No. 09/693,078, filed on October 20, 2000, now Pat No. 6,647,369.--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,533,022 B2 | Page 1 of 1 |
| APPLICATION NO. | : 10/982834 | |
| DATED | : May 12, 2009 | |
| INVENTOR(S) | : Kia Silverbrook, Paul Lapstun and Simon Robert Walmsley | |

It is certified that error appears in the above-identified patent and that said Letters Patent is hereby corrected as shown below:

Col. 6, line 28-34

Claim 1 should read:

--1. A printed media comprising:
a photographic medium;
a visible light ink printed on said medium, the visible light ink representing an image for viewing by a human; and
infra-red ink printed over said visible light ink, said infra-red ink defining a machine readable array of markings invisible to the human eye, the markings encoding data.--

Signed and Sealed this
First Day of March, 2011

David J. Kappos
*Director of the United States Patent and Trademark Office*